United States Patent
Bowen et al.

(10) Patent No.: US 9,869,829 B2
(45) Date of Patent: Jan. 16, 2018

(54) OPTICAL INTERPOSER FOR WAVEGUIDES

(71) Applicant: Tyco Electronics Corporation, Wilmington, DE (US)

(72) Inventors: Terry Patrick Bowen, Dillsburg, PA (US); Jan Willem Rietveld, Benschop (NL)

(73) Assignees: TE Connectivity Corporation, Berwyn, PA (US); TE Connectivity Nederland B.V. (NL)

( * ) Notice: Subject to any disclaimer, the term of this patent is extended or adjusted under 35 U.S.C. 154(b) by 0 days.

(21) Appl. No.: 14/467,721

(22) Filed: Aug. 25, 2014

(65) Prior Publication Data
US 2014/0363122 A1    Dec. 11, 2014

Related U.S. Application Data

(63) Continuation of application No. 13/017,668, filed on Jan. 31, 2011, now Pat. No. 8,818,144, which is a
(Continued)

(51) Int. Cl.
*G02B 6/30*     (2006.01)
*G02B 6/12*     (2006.01)
(Continued)

(52) U.S. Cl.
CPC ............ *G02B 6/423* (2013.01); *G02B 6/122* (2013.01); *G02B 6/136* (2013.01); *G02B 6/3636* (2013.01);
(Continued)

(58) Field of Classification Search
CPC ........ G02B 6/122; G02B 6/136; G02B 6/138; G02B 6/42; G02B 6/421; G02B 6/4214;
(Continued)

(56) References Cited

U.S. PATENT DOCUMENTS

| 5,345,524 A | * | 9/1994 | Lebby .................. G02B 6/138 |
| | | | 385/88 |
| 5,987,202 A | | 11/1999 | Gruenwald et al. |

(Continued)

FOREIGN PATENT DOCUMENTS

| JP | H10-170769 A | 6/1998 |
| JP | H11-502633 A | 3/1999 |

(Continued)

OTHER PUBLICATIONS

Wiesmann et al., "Monomode Polymer Waveguides with Integrated Mirrors", 22$^{nd}$ European Conference on Optical Communications (ECOC '96), vol. 2 pp. 265-268.*

*Primary Examiner* — Akm Enayet Ullah
*Assistant Examiner* — Michael Mooney

(57) ABSTRACT

A process for preparing a subassembly, the process comprising (a) defining the location of one or more grooves for receiving at least one polymer waveguide in a wafer, (b) etching the grooves into the wafer, each groove having sidewalls and a first facet at the terminal end perpendicular to the side walls, the first facet having a first angle relative to the top planar surface, (c) coating the first facet with a reflective material, and (d) disposing a fluid polymer waveguide precursor into each groove, and writing a core into the polymer material by directing at least one laser beam on the first facet by directing the laser beam into the top of the polymer material such that the beam reflects off of the first facet and down the interior of the polymer material to form the core in the polymer waveguide.

16 Claims, 19 Drawing Sheets

Related U.S. Application Data continuation-in-part of application No. 13/013,402, filed on Jan. 25, 2011, now Pat. No. 9,036,955.

(51) Int. Cl.

| | | |
|---|---|---|
| *G02B 6/36* | (2006.01) | |
| *G02B 6/44* | (2006.01) | |
| *G02B 6/42* | (2006.01) | |
| *G02B 6/122* | (2006.01) | |
| *G02B 6/136* | (2006.01) | |
| *G02B 6/138* | (2006.01) | |

(52) U.S. Cl.
CPC ......... *G02B 6/3652* (2013.01); *G02B 6/4214* (2013.01); *G02B 6/4228* (2013.01); *G02B 6/138* (2013.01); *G02B 6/30* (2013.01); *G02B 6/42* (2013.01); *G02B 6/421* (2013.01); *G02B 6/4243* (2013.01); *G02B 6/4249* (2013.01); *G02B 2006/12176* (2013.01); *Y10S 430/146* (2013.01)

(58) Field of Classification Search
CPC ...... G02B 6/4243; G02B 6/4249; G02B 6/30; G02B 2006/12176; Y10S 430/146
USPC ............. 385/14, 24, 31, 49–52, 88–92, 123, 385/129–132; 264/1.24–1.29, 1.36, 1.37; 438/29, 31, 460–465; 204/192.1
See application file for complete search history.

(56) References Cited

U.S. PATENT DOCUMENTS

| | | | |
|---|---|---|---|
| 6,511,235 | B2 | 1/2003 | Guo et al. |
| 6,640,021 | B2* | 10/2003 | Pogge ................ G02B 6/12004 |
| | | | 385/131 |
| 7,511,258 | B2 | 3/2009 | Bowen et al. |
| 7,703,993 | B1 | 4/2010 | Darbinyan et al. |
| 8,031,993 | B2 | 10/2011 | Bowen |
| 8,818,144 | B2 | 8/2014 | Bowen et al. |
| 9,036,955 | B2 | 5/2015 | Bowen et al. |
| 2004/0258345 | A1* | 12/2004 | Griese ................ G02B 6/138 |
| | | | 385/14 |
| 2005/0185892 | A1 | 8/2005 | Kwon et al. |
| 2005/0224946 | A1 | 10/2005 | Dutta |
| 2010/0142886 | A1 | 6/2010 | Warashina et al. |

FOREIGN PATENT DOCUMENTS

| | | |
|---|---|---|
| JP | 2006-259590 A | 9/2006 |
| JP | 2007-241211 A | 9/2007 |
| JP | 2008-046333 A | 2/2008 |
| JP | 2008-122741 A | 5/2008 |
| TW | 201028748 A1 | 8/2010 |

\* cited by examiner

OPTICAL INTERPOSER FOR WAVEGUIDES

REFERENCE TO RELATED APPLICATIONS

This application is a continuation of application Ser. No. 13/017,668 filed Jan. 31, 2011, which is a continuation-in-part of application Ser. No. 13/013,402, filed Jan. 25, 2011, which are hereby incorporated by reference.

FIELD OF INVENTION

The subject matter herein relates generally to fiber optic substrates, and more particularly, to an interposer with optical coupling and alignment features.

BACKGROUND OF INVENTION

Fiber optic components are used in a wide variety of applications. The use of optical fibers as a medium for transmission of digital data (including voice, internet and IP video data) is becoming increasingly more common due to the high reliability and large bandwidth available with optical transmission systems. Fundamental to these systems are optical subassemblies for transmitting and/or receiving optical signals.

Optical subassemblies typically comprise an interposer. As used herein, an interposer functions as a substrate for optical, opto-electrical, and electrical components and provides interconnections to optically and/or electrically interconnect the optical/opto-electrical/electrical components. For example, a typical interposer may comprise a substrate, for example, silicon, having one or more grooves formed therein for securing an optical fiber. The conventional groove is formed in the shape of a "V" by wet etching the substrate to include two sidewalls that retain the optical fiber along its length and an end face that is used as a mirror device. The conventional V-groove has a particular pitch α, which is the angle between the walls of the V-groove and a top or reference surface in which the V-groove was etched. Each of the sidewalls and the end face are typically formed at a precise angle of 54.7 degrees from the reference surface due to the crystalline structure of silicon.

During operation, the end face of a conventional interposer V-groove is metalized so that it may be used as a mirror to reflect light between the optical/opto-electrical component and the optical fiber. For example, in the case of a transmitter, an opto-electrical light source emits a cone-shaped light beam onto the V-groove end face mirror. The V-groove end face mirror reflects the light through an end of the optical fiber retained in the V-groove. As discussed above, the surface of the V-groove end face is at an angle of precisely 54.7 degrees from the reference surface. As such, light is reflected off the groove end face mirror through the optical fiber at approximately −9.3 degrees from the reference surface and also from the longitudinal axis of the optical fiber retained in the V-groove. Therefore, current devices utilizing the end face mirror of the groove to launch light through an end of the optical fiber cause much of the light to be reflected away from the axis of the optical fiber resulting in non-optimal signal transmission performance.

Therefore, Applicants recognize that there is a need for an improved optical coupling between the optical/opto-electrical component and the optical fiber or an optical planar waveguide. Additionally, Applicants recognize that this optical coupling should be achievable through passive alignment rather than active alignment to facilitate economic production of the subassembly. To this end, Applicants recently filed a new patent application (U.S. application Ser. No. 12/510,954, incorporated herein referenced) disclosing a multi-faceted fiber end face mirror for optical coupling. Specifically, the facets of the fiber end face mirror included a 54.7 degree facet to mechanically contact the end face of the V-groove to precisely position the optical fiber end face mirror in the V-groove along the longitudinal axis and under the emission aperture of the opto-electrical device. Additionally, another facet was a 45 degree facet to facilitate optimal optical coupling between the optical axis of the fiber and the optical axis of the opto-electrical device. Additional facets were also disclosed for enhancing performance. Each of these facets would then be coated with a metal to act as a reflective mirror surface.

Although this development improved the optical performance and facilitated passive alignment of the subassembly, it also required coating the fiber end face on a number of different facets with a metallic/reflective coating. Applicants have identified an additional need to avoid the requirement for depositing a reflecting coating on fiber end faces as such a process tends to be difficult and expensive and may be time prohibitive in a high volume application.

Therefore, a need exists for a simplified means for preparing an optical assembly having good optical coupling to either an optical fiber or an optical planar waveguide and performing this optical coupling by passive alignment. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides an interposer that functions as a substrate for securing optical and/or opto-electrical components while providing a configurable reflective surface for optically coupling an optical component with an optical fiber or with an optical planar waveguide. Specifically, Applicants recognize that dry etching techniques can be used to configure a groove with a dry-etched facet that is better suited to optically couple the optical component and fiber/planar waveguide than a traditional wet-etched facet of 54.7 degrees. For example, in an embodiment in which the optical axis of the fiber/planar waveguide is essentially at a right angle to that of the optical axis of the optical component, a 45 degree facet is dry-etched into the substrate. This facet is then coated with a reflective material to act as a reflective surface/optical coupling mirror.

In one embodiment, the air gap between the reflective surface and the fiber/planar waveguide end face is reduced by configuring the fiber/planar waveguide end face with a corresponding mating facet having essentially the same angle as the reflective facet at the terminal end of the groove. This way, when the fiber/planar waveguide is disposed in the interposer groove, the facets of the substrate and fiber/planar waveguide end face mechanically contact each other. Additional contacting or non-contacting facets may be added to the interposer optical coupling mirror and fiber/planar waveguide end face to improve optical coupling.

In one embodiment, the interposer has features that facilitates its incorporation with planar waveguides. For example, because the edge of the interposer is precisely prepared, it provides a good interface with planar waveguides. To this end, fiber stubs or discrete waveguides can be disposed in the groove(s) between the optical component and the edge to interface with the planar waveguide. Alternatively, the planar waveguide may have discrete waveguide fingers defined at one end, with each discrete waveguide finger being disposed in a groove of the interposer. Still other configurations are possible using the interposer of the present invention.

In one embodiment, the interposer also has features that facilitate passive alignment. For instance, as mentioned above, the groove has one or more facets to receive the fiber/planar waveguide end face. This configuration enables the fiber/planar waveguide to be pushed forward in the groove and when the corresponding facets contact, the fiber/planar waveguide is positioned precisely on the interposer. Additionally, the interposer may be provided with fiducials such as, for example, contact pads, visual markers or protrusions to register the optical component on its top planar surface relative to the positions of the fiber/planar waveguide grooves.

In yet another embodiment, the interposer provides for electrical interconnects between the optical component and related drive/receive circuitry to interface the subassembly with a higher level source/receive component.

In light of the above, one aspect of the invention is an interposer comprising a configurable reflective surface for optically coupling the fiber/planar waveguide with an optical component. In one embodiment, the interposer comprises: (a) a substrate having a top planar surface: (b) at least one groove defined in the top planar surface and extending from an edge of the substrate to a terminal end, the groove having side walls and a first facet at the terminal end perpendicular to side walls, the facet having a first angle relative to the top planar surface, the first angle being about 45 degrees; (c) a reflective coating on the first facet; and (d) an optical conduit disposed in the groove and extending between the first facet and the edge of the substrate.

Another aspect of the invention is a subassembly comprising the interposer integrated with an optical component and an optical conduit such as a fiber/planar waveguide. In one embodiment, the subassembly comprises: (a) an optical interposer comprising at least (i) a substrate having a top planar surface; (ii) at least one groove defined in the top planar surface and extending from an edge of the substrate to a terminal end, the groove having side walls and a first facet at the terminal end perpendicular to the side walls, the first facet having a first angle of 45° relative to the top planar surface; and (iii) a reflective coating on the first facet; (b) an optical fiber/planar waveguide disposed in the groove having an optical axis and an end face; (c) an optical component having an optical axis perpendicular to the top planar surface, the optic device being disposed on the top planar surface at the terminal end such that its optical axis is accurately disposed over the first facet such that the optical component is optically coupled with high efficiency with the core of the optical fiber/planar waveguide, and (d) a planar waveguide optically coupled to the optical fiber/waveguide at the edge of the interposer.

Another aspect of the invention is a process of preparing the interposer. In one embodiment, the process comprises: (a) defining the location of one or more grooves for receiving fibers/planar waveguides for multiple interposers on a top surface of common wafer; (b) defining the location of patterns of contact pads on the top surface, each pattern configured to receive an optical component; (c) defining the location of electrical traces interconnecting the contact pads; (d) etching the grooves into the wafer, each groove having sidewalls and a first facet at the terminal end perpendicular to the side walls, the first facet having a first angle relative to the top planar surface; (e) coating the first facet with a reflective material; (f) depositing the electrical traces; and (g) depositing the contact pads.

Yet another aspect of the invention is a process of preparing a subassembly in which the interposer is coupled to a planar waveguide. In one embodiment, the process comprises: (a) defining the location of one or more grooves for receiving optical conduits in a wafer; (b) etching the grooves into the wafer, each groove having sidewalls and a first facet at the terminal end perpendicular to the side walls, the first facet having a first angle relative to the top planar surface; (c) coating the first facet with a reflective material; (d) disposing an optical conduit in each groove to optically couple the first facet with a planar waveguide. In one embodiment, a planar waveguide is disposed at the edge of the interposer and is optically coupled to the optical conduit. In another embodiment, the optical conduit is integral with the planar waveguide.

DETAILED DESCRIPTION

Figure 1:
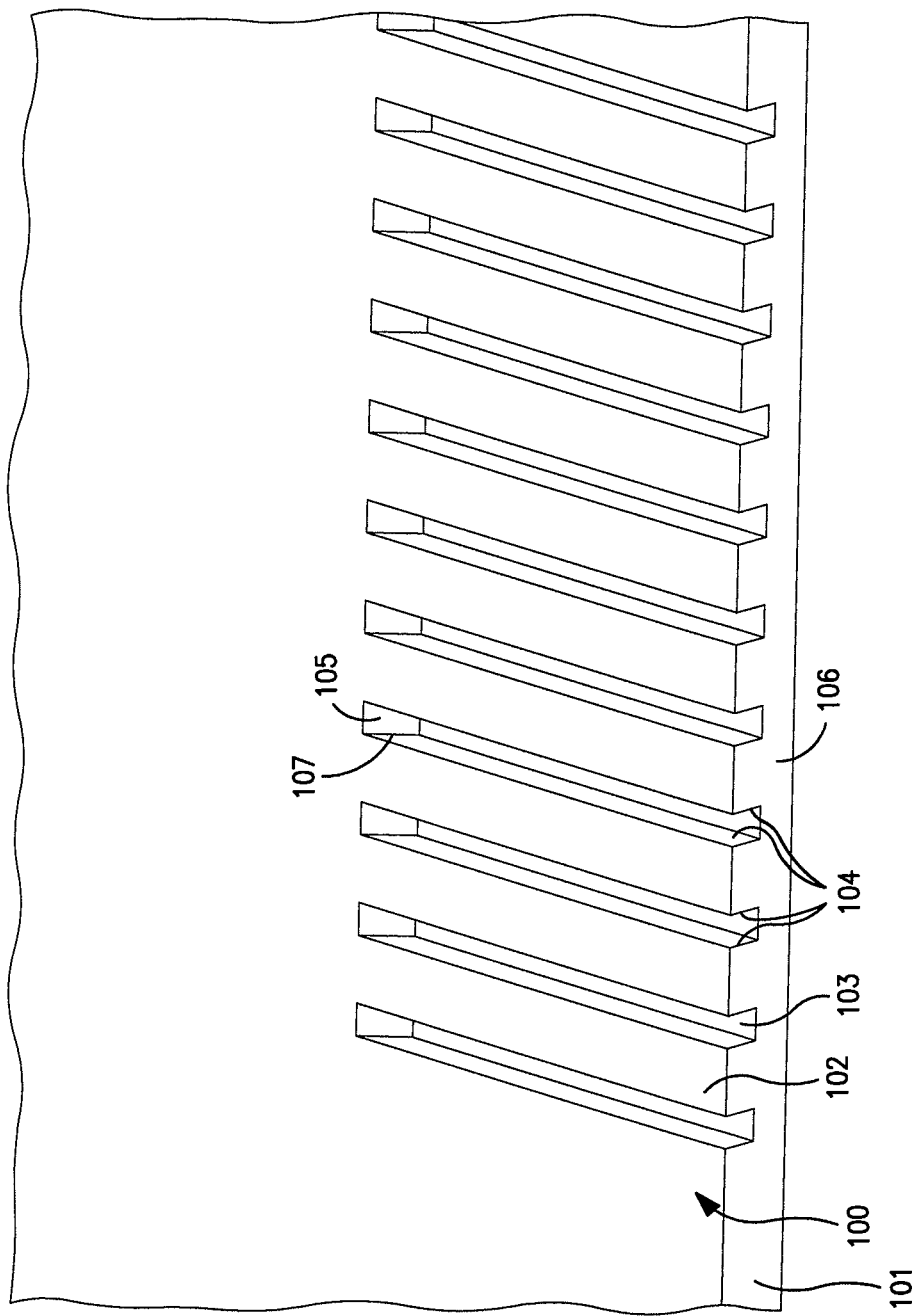
FIG. 1 shows a schematic of a substrate having U-groove of the present invention.

Referring to FIG. 1, one embodiment of an optical interposer 100 of the present invention is shown. The optical interposer 100 comprises a substrate 101 having a top planar surface 102 and at least one groove 103 defined in the top planar surface, extending from an edge 106 of the substrate to a terminal end 107. The groove 103 has side walls 104 and a first facet 105 at the terminal end, which is essentially perpendicular to side walls. The first facet is configured at a first angle α relative to the top planar surface. A reflective coating (not shown) is deposited on the first facet 105.

Figure 12:
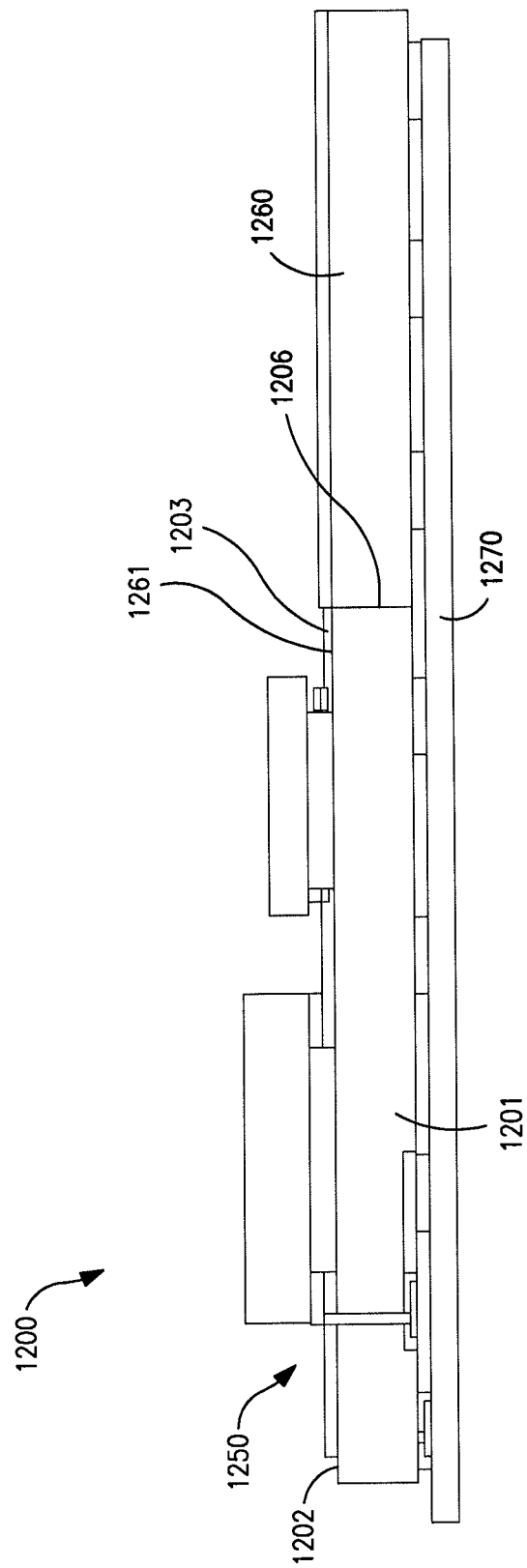
FIG. 12 shows an embodiment of the interposer coupled to a planar waveguide.

Referring to FIG. 12, another embodiment of a subassembly 1200 comprising the interposer 1250 integrated with a waveguide 1260 is shown. Like the interposer 100 described above, the interposer 1250 comprising at least a substrate 1201 having a top planar surface 1202 and at least one groove 1203. The groove is defined in the top planar surface and extends from an edge 1206 of the substrate to a terminal end (not shown). Like the groove 103 described above, groove 1203 has side walls and a first facet at the terminal end perpendicular to the side walls, and the first facet has a first angle relative to the planar surface. A reflective coating is disposed on the first facet. In the groove 1203 is disposed an optical conduit 1261, which extends to the edge 1206. The optical conduit has an optical axis and an end face with at least a first mating facet having essentially the first angle relative to its optical axis such that the first mating facet and the first facet contact each other. The subassembly 1200 also comprises an optical component 1220 having an optical axis (not shown) perpendicular to the top planar surface. The optic component is disposed on the top planar surface 1202 at the terminal end such that its optical axis is disposed over the first facet such that the optical component is optically coupled with the core of the optical conduit. Disposed at the edge 1206 is a waveguide 1260 optically coupled to the optical conduit 1261 at the edge.

Each of these elements and alternative embodiments are described in greater detail below.

A primary function of the interposer is to provide a substrate or backbone to support and secure an optical conduit, optical component(s) and supporting electrical circuitry. As used herein, an optical conduit refers to any know medium for facilitating the propagation of optical signal in a certain direction. Common optical conduits include, for example, optical fibers and planar waveguides. To support the optical conduit, the substrate should comprise a rigid material that can be etched or machined to define the grooves and is thermally stable, suitable for being heated to temperatures typical in solder reflow applications. Examples of suitable materials include elemental materials having a crystalline form, polymeric material, glass, ceramics (i.e., oxides, nitrides, carbides, borides and silicides of metals or semi-metals and combinations thereof), quartz, and metals.

Figure 5:
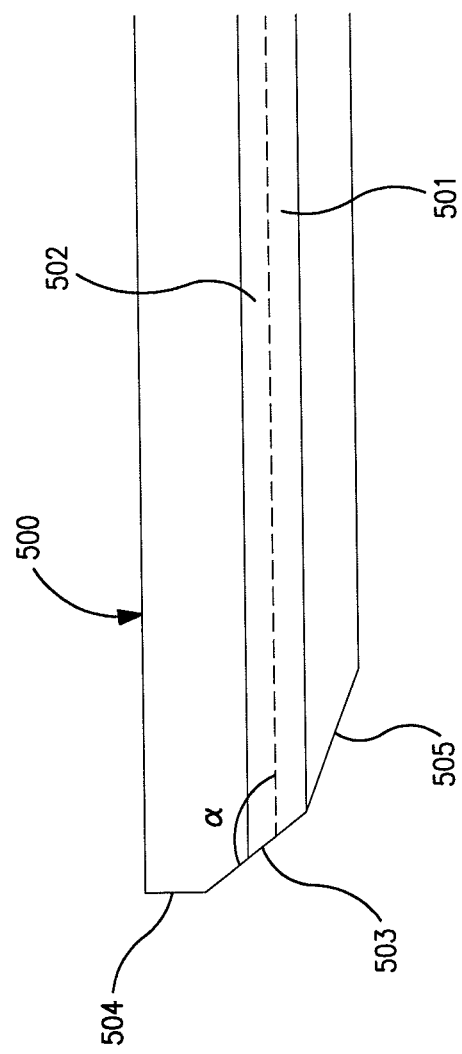
FIG. 5 shows a side schematic view of a fiber having a profiled end face for seating in the interposer of the present invention.
Figure 6:
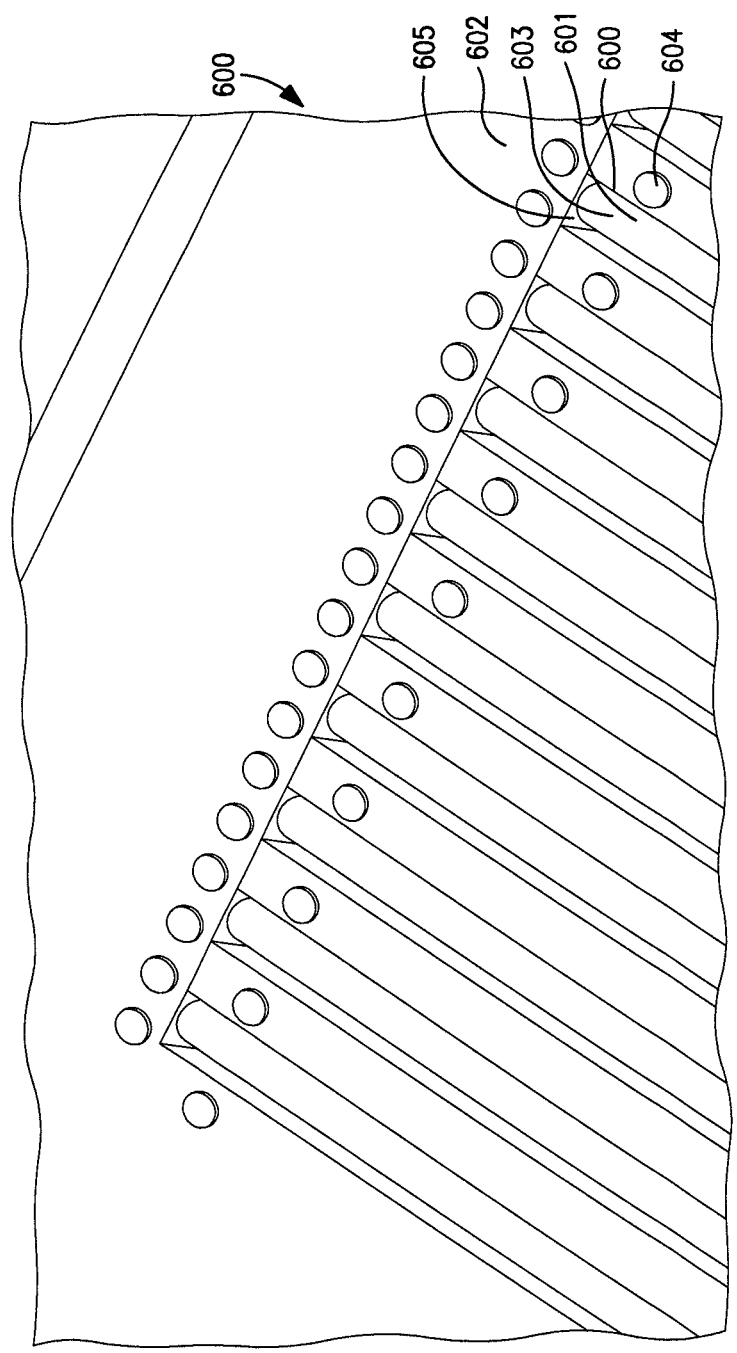
FIG. 6 shows the interposer of FIG. 1 with fibers disposed in each of the grooves.

The optical conduit, which may be an optical fiber or planar waveguide, is disposed in each of the grooves 103. For example, referring to FIG. 6, an interposer 600 is shown having a plurality of grooves 601 defined in the top surface of the substrate 602. A fiber 603 is disposed in each groove such that the end face 606 of the fiber is in physical contact with a first facet 605 of the terminal end of the groove 601. (Also shown in FIG. 6 are contact pads 604 for electrically connecting and aligning the optical component as described below.) Referring to FIG. 5, the optical fiber 500 has an optical axis 501, a core 502, and an end face 503 with at least a first mating facet 504 at essentially the first angle α, relative to the optical axis 501 such that the first mating facet and the first facet of the terminal end make physical contact with each other when the fiber is disposed in the groove as shown in FIG. 6.

In the embodiment in which the interposer 1250 of the present invention is combined with a waveguide 1260 as shown in FIG. 12, the optical conduit 1261 functions to optically couple the first facet to the waveguide 1260, and may have a number of different embodiments. In one embodiment, the optical conduit 1261 is a fiber stub in which one end is configured as described above to interface with the first facet, while the other end is configured to interface with the waveguide 1260. To this end the fiber stub may have a variety of different core diameters (e.g. 35, 45, 50, or 62.5 µm) and it may be a gradated index or a step index.

Figure 16:
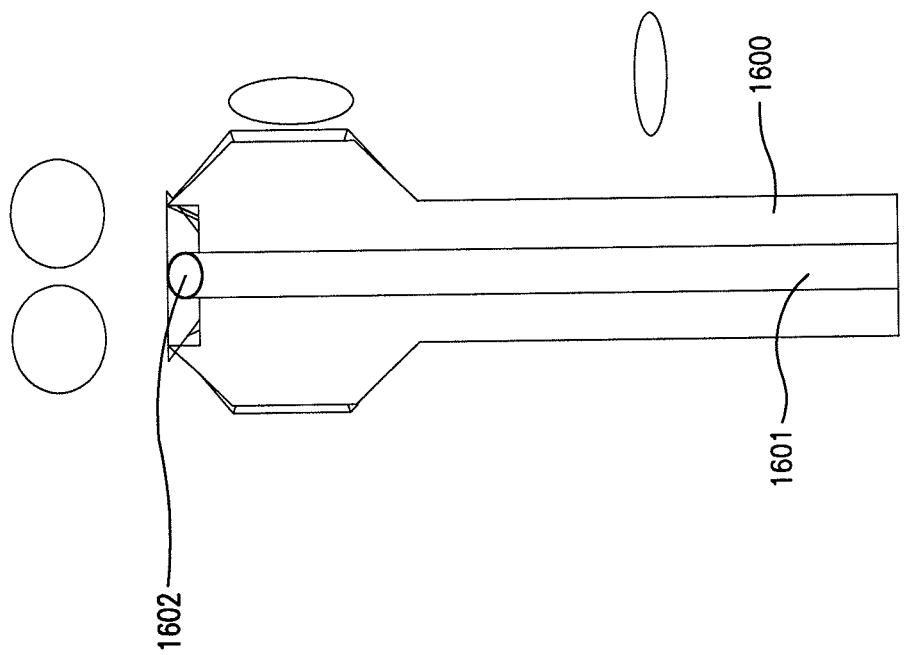
FIG. 16 shows the core produced in the polymer waveguide from the writing process illustrated in FIG. 15.

Alternatively, the optical conduit 1261 may be a polymer waveguide. Different embodiments of the polymer waveguides are possible in the present invention. For example, in one embodiment, the polymer waveguide 1600 comprises a core 1601 defined in its interior to contain the propagating light as shown in FIG. 16. The core case be any size (e.g. 35, 45, 50, or 62.5 µm). Alternatively, rather than having the core defined in the polymer waveguide, the polymer waveguide may be just the core—i.e. it may comprise only core material. To this end, the grooves may be etched to correspond to the core size (e.g. 35, 45, 50, or 62.5 µm). To ensure light is reflected by the side walls and the bottom of the groove (and not absorbed by the substrate), the walls and bottom may be coated with a reflective material. The difference between the refractive indices of the polymer waveguide and air prevents the laser light from escaping through the top of the waveguide.

Figure 20:
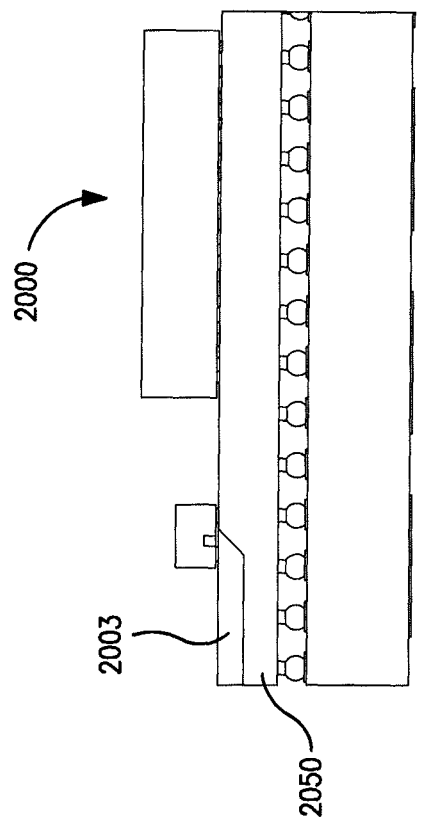
FIG. 20 shows a side view of the interposer of the present invention, in which the grooves are suitable for receiving the discrete waveguide fingers shown in FIG. 19.

In yet another embodiment, the waveguide 1260 is integrally-formed with the optical conduit 1261. For example, referring to FIG. 19, one end of the waveguide 1260, which, in this embodiment, is a ribbon waveguide 1260a, may be modified such that individual waveguides are presented in discrete waveguide fingers 1261a. Each finger 1261a may be inserted into a corresponding groove 2003 of the interposer 2050 of the subassembly 2000 shown in FIG. 20.

In one embodiment, the parallel side walls of the groove hold the fiber in place. (Although single fiber applications are shown and described herein, it should be appreciated that the invention is not limited to single fiber applications and may be applied to arrays of fibers and ribbon fiber and to planar waveguide arrays and ribbons as well.) The sidewalls may be the walls of a traditional V-groove, or they may be perpendicular to the top planar surface such that they form more of a U-groove. As mentioned above, wet etching may be used to form V-grooves, while dry etching as discussed below can be used to form any side wall configuration because the etching process is not dependent on the crystalline structure of the substrate.

In one embodiment, the sidewalls are configured to secure a stripped fiber. For example, referring to FIG. 3, the interposer 300 is shown with stepped V-grooves 303. Like interposer 100 in FIG. 1, interposer 300 comprises a substrate 301 having a top planar surface 302 and a plurality of stepped grooves 303 defined therein. Each groove comprises sidewalls 304 and a terminal end 307 perpendicular to the sidewalls 304. A terminal end comprises a first facet 305 as described above. Unlike the embodiment shown in FIG. 1, however, the grooves are V-grooves 303, which are stepped and have a wide portion 309 and a narrow portion 308. The wide portion 309 is configured to receive both the fiber and its buffer coating, while the narrow section 308 is configured to receive just the bare fiber. As is known in the art, the buffer coating can be stripped from the fiber, leaving just the core and cladding, which is referred to as "bare fiber."

The optical conduit may be secured to the groove in a variety of known ways. For example, a fiber may be metalized and soldered in place or it may be glued in place. In one embodiment, a UV-cured, optically transparent adhesive is used to secure the fiber/planar waveguide in the groove. Such an approach may be preferable to reduce Fresnel losses, as any gaps between the optical component, the terminal end of the groove and the end face of the fiber/planar waveguide would be filled with the optically transparent adhesive.

The optical component may be any known component that is optically coupled to a fiber/planar waveguide. The optical component may be for example (a) a passive component, which does not convert optical energy to another form and which does not change state (e.g., fiber, lens, add/drop filters, arrayed wave guide gratings (AWGs), GRIN lens, splitters/couplers, planar waveguides, or attenuators); (b) an active device which converts between optical energy and electrical energy (e.g., lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); or (c) a hybrid device which does not convert optical energy to another form but which changes state in response to a control signal (e.g., switches, modulators, attenuators, and tunable filters). It should also be understood that the optical component may be a single discrete device or it may be assembled or integrated as an array of devices.

Figure 4:
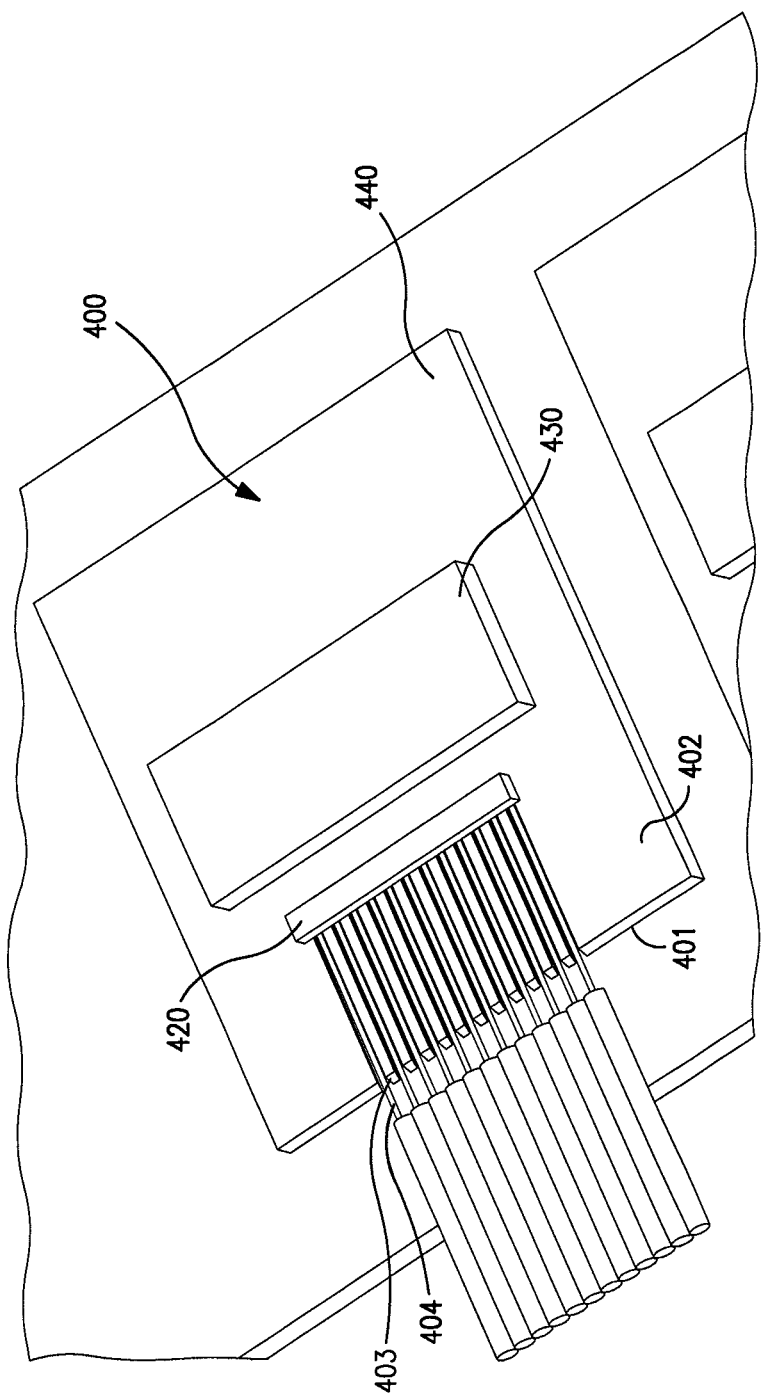
FIG. 4 shows a completed opto-electrical interposer showing the opto-electrical device and related electrical circuitry connected to an array of optical fibers/planar waveguides.

The optical component has at least one optical axis along which the light propagates to/from the optical component. Because the optical component is disposed over the fiber/planar waveguide and optically coupled thereto by virtue of a reflective surface defined in the interposer, generally, although not necessarily, the optical axis is essentially perpendicular to the planar surface. It should be understood that the optical component is not limited to a single optical axis. For example, in the embodiment shown in FIG. 4, the optical component is either a VCSEL array or a PIN array, in which the optical component has multiple optical axes.

In one embodiment, the interposer functions not only to support a fiber/planar waveguide and optical component, but also to optically couple them at high efficiency. To this end, a significant feature of the present invention is the groove 103 with first facet 105, specifically configured to facilitate optical coupling between the optical component and the fiber/planar waveguide. Applicants recognize that dry etching techniques can be used to specifically configure the terminal end of the grooves to provide the optimal first angle α. Dry etching refers to the removal of material typically using a masked pattern by exposing the material to a bombardment of ions (usually a plasma of reactive gases such as fluorocarbons, oxygen, chlorine, boron trichloride; sometimes with addition of nitrogen, argon, helium and other gases) that dislodge portions of the material from the exposed surface. Unlike typical wet etching, dry etching typically etches directionally or anisotropically, and thus is not dependent on the crystalline structure of the substrate.

Because dry etching is not limited or controlled by the crystalline structure of the underlying substrate (unlike traditional wet etching of silicon, which will generally result in a V-groove having a wall slope of 54.7 degrees as mentioned above), dry etching can be used to produce wall slopes of any desired angle in a wide variety of substrate materials. Accordingly, in one embodiment, the first facet 105 is configured with an optimum angle to result in efficient optical coupling between the optical component and the core of the fiber/planar waveguide. Generally, although not necessarily, this angle will be about a 45 degree angle if the optical axis of the fiber/planar waveguide is at a right angle to optical axis of the optical component.

At least the first facet is treated to make it reflective. For example, it may be coated with a metal or other reflective material as is know in the art. Suitable reflective materials include, for example, gold, silver, aluminum and dielectrics. The materials may be deposited on the facets using known techniques, including, evaporation, sputtering and vapor deposition.

Additional facets may be added to the groove to improve optical coupling and/or to improve passive alignment. For example, referring to FIG. 2, an image of the cross section of a U-groove is shown. The substrate 201 defines a terminal end having a first facet 202 at essentially a 45 degree angle with respect to the planar top surface 204. This image also shows a second facet 203 at a steeper (i.e. greater) angle with respect to the top planar surface. Although not necessary, a second facet 203 may be preferable under certain circumstances to provide for enhanced locating of the fiber/planar waveguide in the groove. Specifically, because the angle of second facet 203 is greater than that of first facet 202, it will tend to function as a mechanical stop to prevent forward axial movement of the fiber/planar waveguide more effectively than the first facet because of a reduced upward wedging force between it and the corresponding mating facet of the fiber/planar waveguide.

Other facets may be added to the terminal end of the groove to further enhance optical coupling. For example, as described in U.S. application Ser. No. 12/510,954 with respect to reflective facets on the fiber end face, facets that gradually angle away from the first facet (for example, in 5° increments) tend to enhance optical coupling by focusing divergent light. Still other embodiments of the groove and terminal end facets are possible in light of this disclosure.

Figure 8:
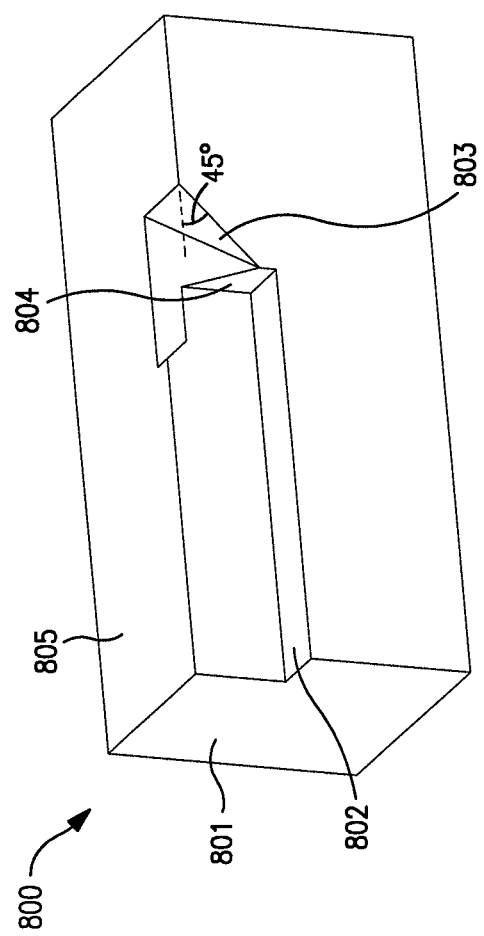
FIG. 8 shows a cross section of an interposer along a groove in which the terminal end of the groove has an additional facet.

Referring to FIG. 8, another embodiment of an interposer 800 is shown, in which a U-groove 802 is defined in a substrate 801 along with a terminal end that is defined by multiple angled faces. In this embodiment, the terminal end is etched in the substrate before the U-groove. The terminal end of this embodiment is masked as a square and then four sides walls are etched from each side of the square (see FIG. 9 for a top view). Each side is etched at a 45° angle relative to the top surface of the substrate 801. One of the sides is the first facet 803 as shown. After the terminal end is etched, the U-groove is etched. In this embodiment, the U-groove is deeper than the terminal end such that a second facet 804 is defined.

Although a square is used to define the terminal end in the embodiment of FIG. 8, it should be understood that other shapes are possible, including polygons with more than four sides. Polygons with multiple sides, particularly a concentration of sides adjacent or near the first facet may be desirable to provide additional facets to focus light as described above. That is, facets that angle gradually away from the first facet tend to improve optical coupling by focusing the light more effectively.

Figure 11:
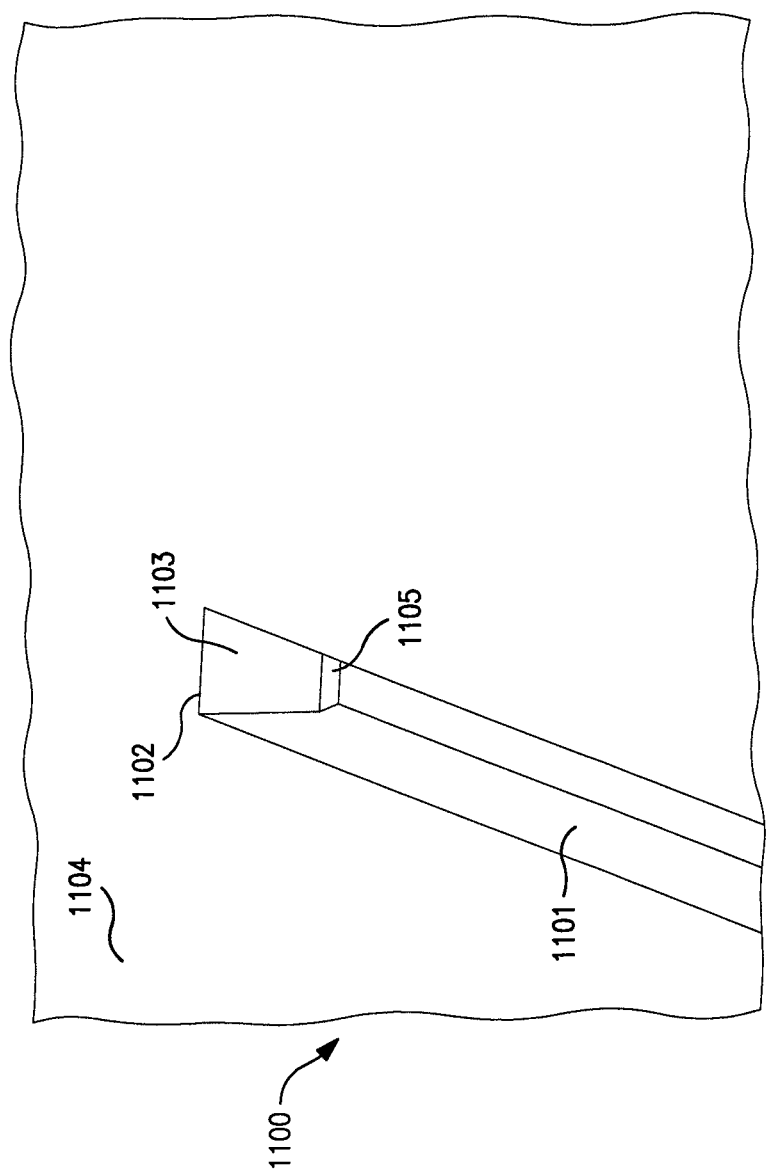
FIG. 11 shows another embodiment of the interposer of the present invention in which the groove has an additional facet similar to that of FIG. 8.

Referring to FIG. 11, another embodiment of the U-groove shown in FIG. 1 is shown. Specifically, interposer 1100 shown in FIG. 11 comprises a U-groove 1101 having a terminal end 1102 with a first facet 1103 at a 45° angle with respect to the top surface 1104 as disclosed in the previous embodiments discussed above. However, like the embodiment shown in FIG. 8, this embodiment defines a second facet 1105, which, as discussed with respect to the second facet shown in FIG. 8, may be used as a stop for the fiber/planar waveguide to enhance its axially positioning/alignment in the groove 1101.

To enhance the effectiveness of the optical coupling, it may be preferable in certain applications to reduce the air gap between the optical component, the facets of the groove and the fiber/planar waveguide end face. Accordingly, in one embodiment, the fiber/planar waveguide end face is configured to have the same profile as that of the terminal end of the groove. To this end, the fiber/planar waveguide end face has at least a first mating facet configured to contact the first facet when the fiber/planar waveguide is dispose in the groove and pushed against the terminal end of the groove. Specifically, referring to FIG. 5, a schematic of a cross section of a fiber of the present invention is shown. The fiber 500 comprises an optical axis 501 and a core 502. A first mating facet 503 is defined on the end face of the fiber. At least a portion of the first mating facet 503 is defined by the core 502 of the fiber.

As mentioned above, it may be desirable in certain applications to further profile the end face of the fiber for additional optical performance and/or passive alignment. For example, fiber 500 comprises a second mating facet 504, which is at an angle greater than that of the first mating facet 503. Such a configuration may be preferable for positioning the fiber passively as any forward motion on the fiber toward the terminal end of the groove will tend to result in less upward force because of wedging action between the second facet of the groove and the second mating facet of the fiber 504. Additionally, it may be preferable to further enhance the optical end face with a third mating facet 505, which is at a greater angle than that of first mating facet 503. Additionally, side facets may be added to the fiber end face on either side of the first mating facet to enhance optical coupling. (see, for example, U.S. application Ser. No. 12/510,954, incorporated herein by reference.) In one embodiment, to the extent the fiber end face has multiple facets, the terminal end of the groove is profiled to have corresponding facets such that the end face of the fiber is received by the terminal end of the groove with minimal air gaps.

Although physical contact between the first mating face of the fiber/planar waveguide and the first facet of the terminal end may be desirable, it is not necessary, and, in certain applications, a space may be desired to facilitate manufacturability. For example, referring to FIGS. 9 and 10, an alternative embodiment of the interposer of the present invention is shown. Specifically, interposer 900 in this embodiment comprises a fiber with a non-profiled end face 902. More specifically, referring to FIG. 10, the fiber 901 is disposed in the groove 802 (it should be noted that the interposer 900 has the same substrate and groove as disclosed in FIG. 8) such that the non-profiled fiber end face 902 abuts against the second facet 804 to axially align the fiber in the interposer 900. In this way, the core of the fiber 901 is optically coupled to the optical component disposed above the terminal end (not shown for simplicity) via the first facet 803, which is coated with a metallic surface as described above. This embodiment offers certain advantages over the profiled fiber end disclosed in FIG. 5. In particular, end faces that are normal to the optical axis are relatively easy to manufacture and can be prepared using standard mechanical cleaving or laser cleaving techniques.

Figure 9:
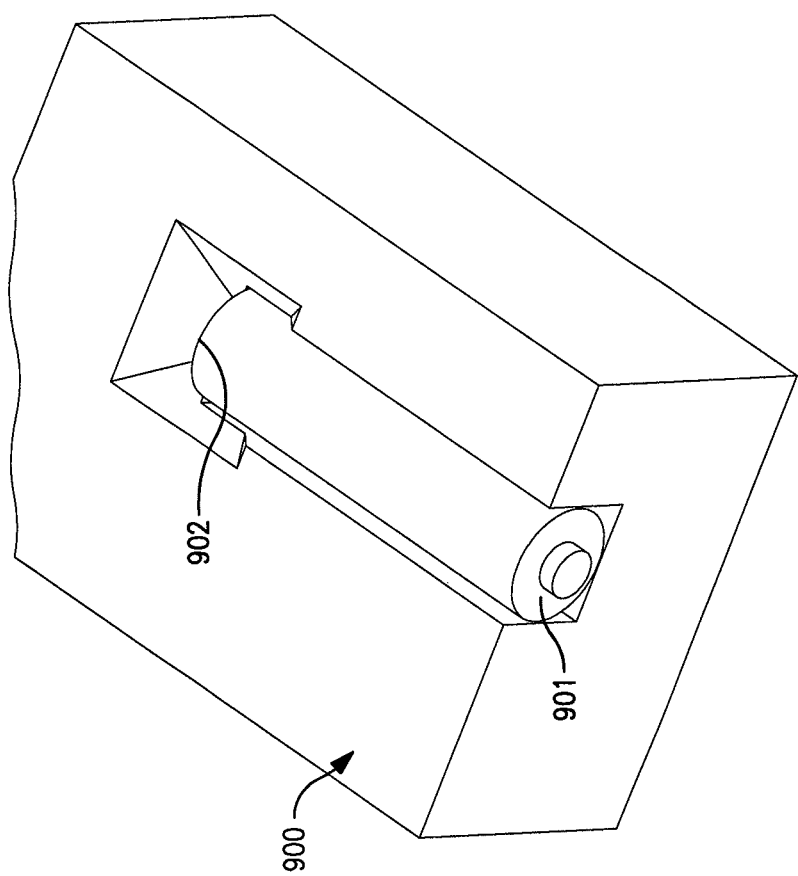
FIGS. 9 and 10 show the substrate of the interposer of FIG. 8 with a non-profiled fiber disposed therein.
Figure 10:
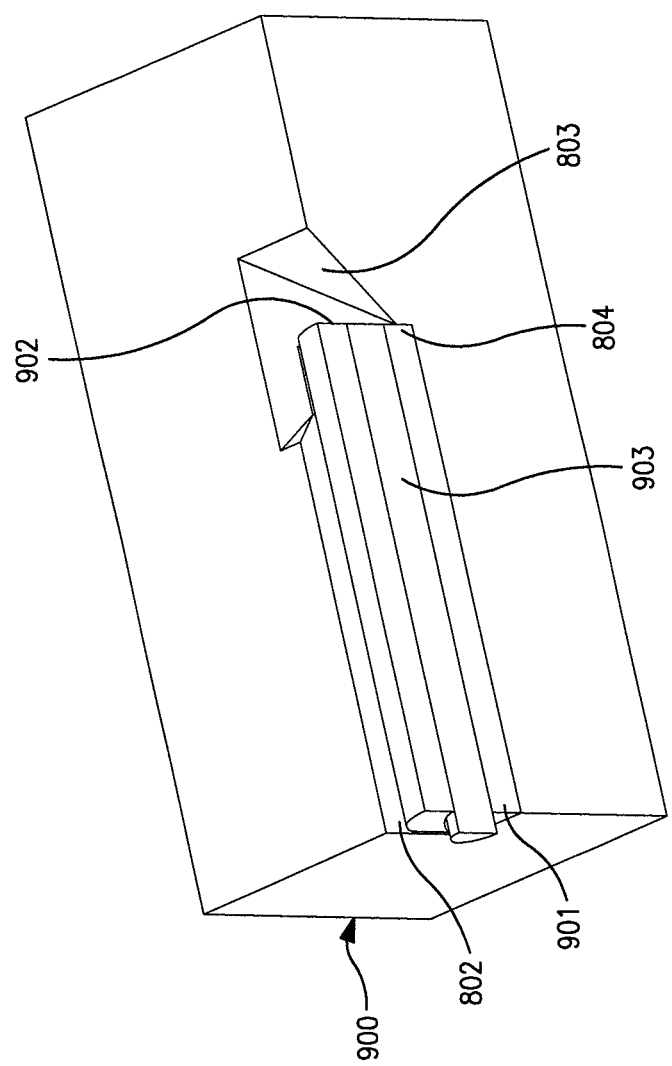

In addition to improved manufacturability due to the non-profiled fiber end face 902 and good axial alignment due to the second facet 804 abutting the fiber end face 902, the embodiment of FIGS. 9 and 10, also has the benefit of a relatively short optical path between the fiber core 903 and the first facet 803 because the lower portion of the first facet is truncated by groove 802. That is, by etching away the lower part of the first facet 803, the core of the fiber can be closer to the reflective surface, which reduces light diffusion and thus improves optical coupling. Therefore, the configuration of the groove and terminal end shown in FIGS. 8, 9 and 10, not only produces a second facet for axial registration of the fiber in the groove, but also shortens the first facet allowing the core of the fiber to get closer to the reflective surface.

Nevertheless, it should be understood that because there is an air gap between the non-profiled end face 902 and the first facet 803, optical performance may still be comprised to some degree. However, this gap may be filled with an optically transparent gel/adhesive or similar substance to improve or enhance the optical coupling between the fiber 901 and the optical component (not shown) disposed above the terminal end of the groove 802.

Figure 14:
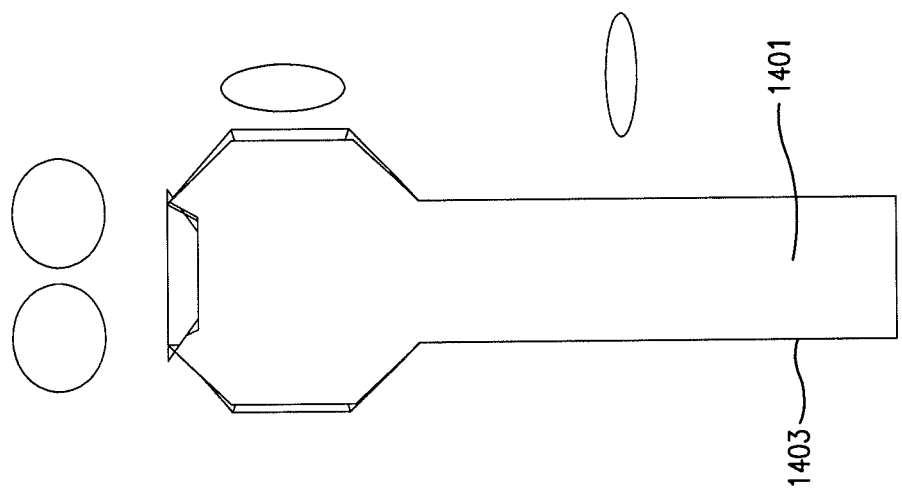
FIG. 14 shows an embodiment of the interposer in which the groove is filled with a polymer waveguide.
Figure 15:
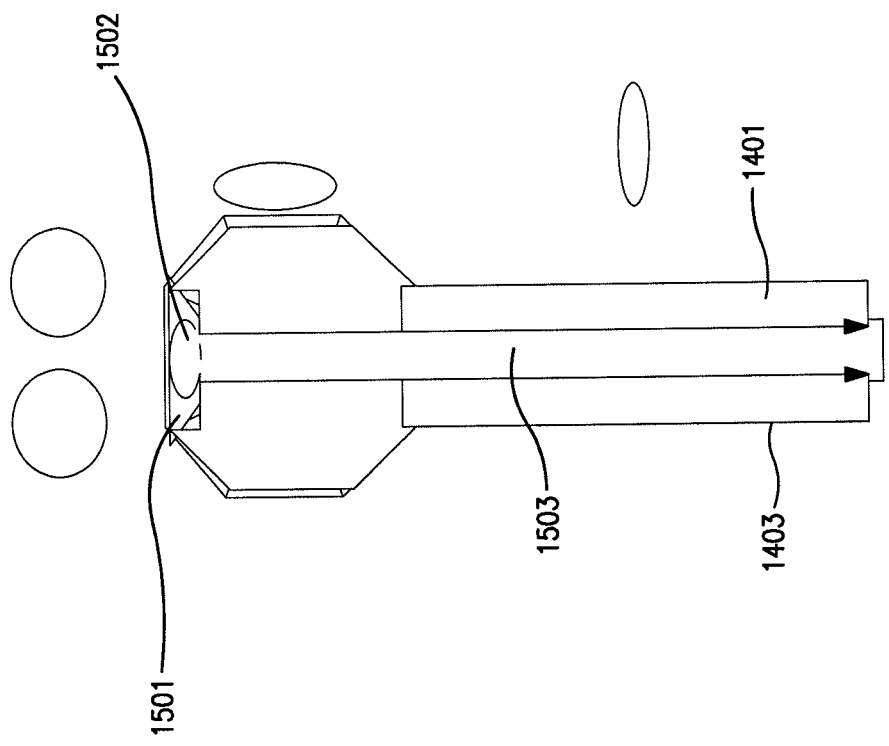
FIG. 15 shows a schematic of the interposer of FIG. 14 in which collimated laser beam is directed onto the first facet and is turned down the length of the polymer waveguide to write a core into the waveguide.

Considering now the disposition of a polymer waveguide in the groove, several process alternatives are available. For example, in the embodiment of FIG. 16 in which the core is defined in the interior of the waveguide, a number of techniques may be used. In one embodiment, the process comprises pouring a fluid polymer waveguide precursor into each groove 1403 and curing the precursor to form the polymer waveguide 1401 as shown in FIG. 14. In this embodiment, the polymer material used is the type that forms a core material upon contact with one or more laser beam(s) of a certain intensity. (Such polymer materials are known.) Typically, converging laser beams are used. Next, as shown in FIG. 15, one or more laser beams are focused on the first facet 1501 such that the initial beam(s) 1502 are turned, and then the beams 1503 propagate down the waveguide 1401, forming the core 1601 (see FIG. 16) as they go. As shown in FIG. 16, this results in an first core 1602 starting at the top surface of the waveguide 1600 and a second core 1601 are essentially a right angle to the first core 1602 which travels axially down the waveguide 1600.

In another embodiment, the core is defined directly in the waveguide. To this end, the groove is filled with polymer waveguide precursor to a point corresponding to the bottom of the core. Then another layer of polymer waveguide precursor is applied, but this layer is formulated specifically to turn into core material upon contact with a laser beam of sufficient energy. Next, one or more lasers are used to write a core down the middle of the waveguide, thus turning that polymer material into a core. The specially-formulated material on either side of the core, which did not come in contact with the laser beam, is then washed away, and a top layer of polymer material is applied to encapsulate the core.

Figure 19:
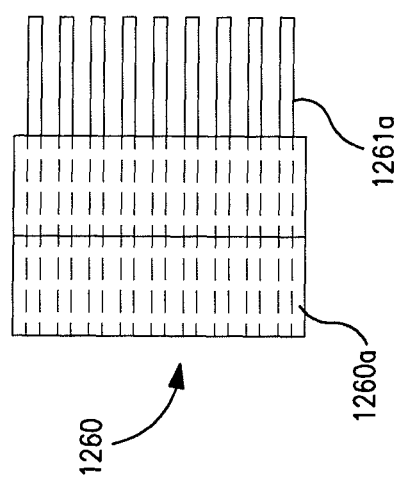
FIG. 19 shows an end of ribbon waveguide in which the discrete waveguide fingers have been defined.

In another embodiment, discrete waveguide fingers 1261*a* are formed by stripping away waveguide material as shown in FIG. 19. This fingers 1261*a* may then be inserted into the grooves of the interposer as discussed above.

Still other ways of disposing a waveguide in the grooves of the interposer will be obvious to one of skill in the art in light of this disclosure.

The interposer of the present invention also comprises features for passively aligning the fiber/planar waveguide and the optical component. One of the primary technical challenges associated with the manufacture of optical assemblies, especially systems offering higher levels of integration, is component optical alignment. This is especially applicable in free-space, interconnect optical systems where discrete optical components, such as active devices (e.g., semiconductor lasers), passive devices (e.g., filters), and/or MOEMS (micro-optical electromechanical systems) (e.g., tunable filters and switches) are integrated on a common mounting system to exacting tolerances, typically in the sub-ten micrometer down to sub-micrometer range.

There are generally two alignment approaches for aligning optical components—active and passive. In passive alignment, registration or alignment features are typically fabricated directly on the components as well as on the platform to which the components are to be mounted. The components are then positioned on the platform using the alignment features and affixed in place. In active alignment, the optical components are placed on the platform, but before being affixed thereto, an optical signal is transmitted through the components while they are manipulated to provide optimum optical performance. Once optimum performance is achieved, the components are affixed to the platform. Although active alignment tends to be more precise than passive alignment, passive alignment facilitates high-speed, high-volume automated manufacturing and, thus, is preferred. It tends to be exceedingly difficult, however, to optically align in all three axes using passive alignment, especially if exceptionally good alignment is required. Nevertheless, a significant reduction in manufacturing time and costs can be realized if passive alignment can be used to achieve acceptable alignment along two axes or even one so that active alignment is only necessary for the remaining axes or for fine tuning.

Figure 2:
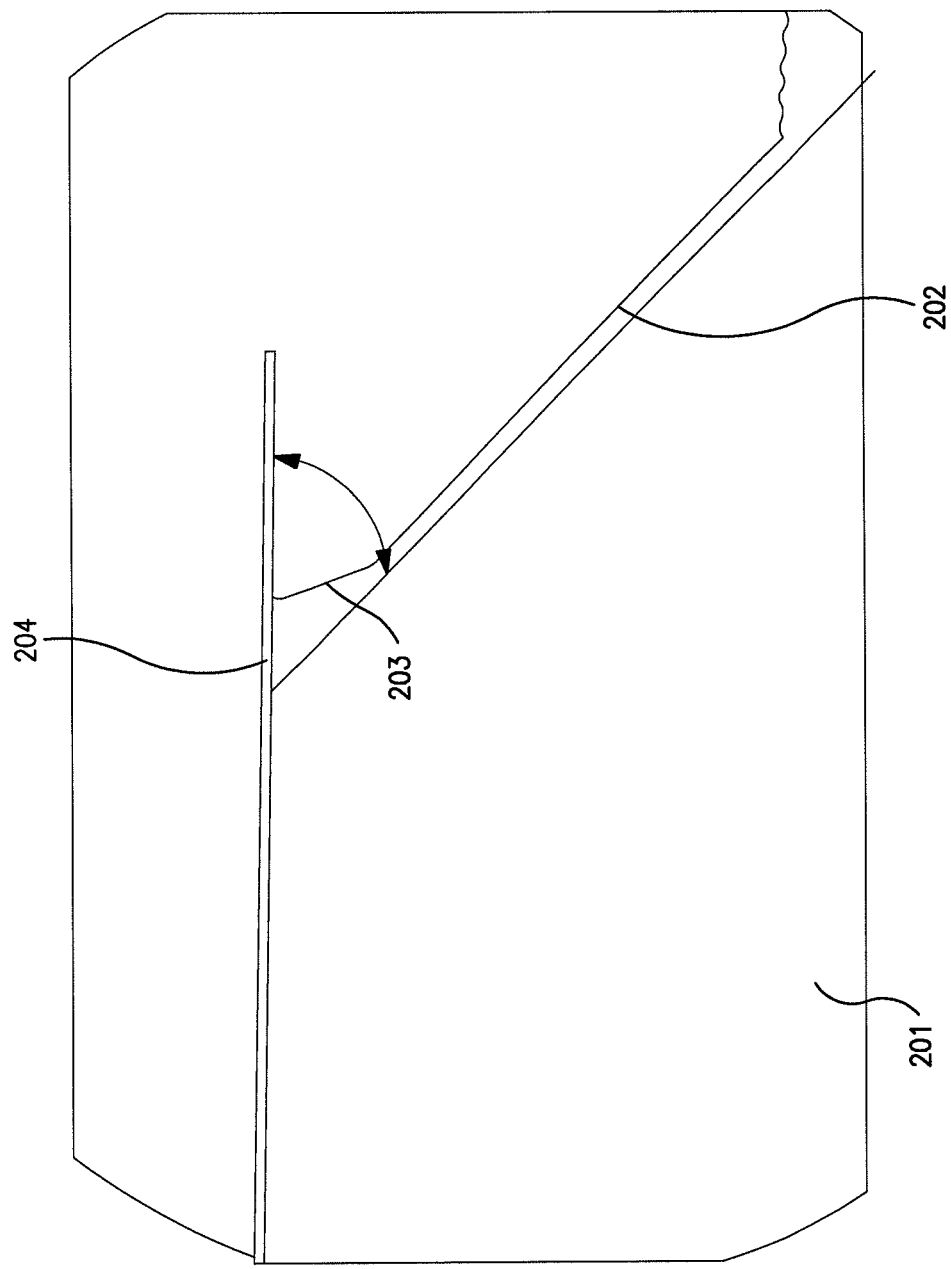
FIG. 2 shows an image of a cross section of the terminal end of a U-groove of the present invention.

The interposer of the present invention may have a number of features to facilitate passive alignment of the fiber/planar waveguide and/or optical component. For example, as already mentioned above, to facilitate passive alignment of the fiber/planar waveguide in the interposer, the terminal end of the groove is profiled to receive the end face of the fiber/planar waveguide. This allows the fiber/planar waveguide to be pushed into the interposer until its end stubs against the terminal end of the groove. Because the terminal end is profiled to receive the end face of the fiber/planar waveguide, the fiber/planar waveguide end face seats against the terminal end along one or more mating facets, thus ensuring a precise positioning. To further enhance this alignment, in one embodiment, at least a second facet of the terminal end has a relative steep angle with respect to the top planar surface to reduces the upward wedging force on the fiber/planar waveguide as it is pushed forward into the terminal end of the groove. To this end, the second facet is greater than 45 degrees as shown in FIG. 2. Another approach for limiting the upward movement of the fiber/planar waveguide caused by the wedging action of the first facet against the mating first facet of the groove is to position the first optical component immediately over the terminal end of the groove such that the clearance between the top of the fiber/planar waveguide and the bottom of the optical component is tight, thus limiting the amount of upward movement, and hence axial movement, of the fiber/planar waveguide in the groove.

In one embodiment, the interposer also has fiducials to facilitate passive alignment of the optical component such that each of its optical axes are aligned with its respective first facet of the groove. Fiducials may be any structure or marking which provides for the passive alignment of the optical component. A variety of fiducials may be used. In one embodiment, a pattern of contact pads are used that passively align the optical component during a reflow operation. Specifically, the optical component is provided with a certain pattern of contact pads on its bottom, the interposer has the same pattern on its top planar surface. The optical component is then placed on the pads in rough alignment using known pick and place technology. Alignment between the interposer and optical component is then achieved when the assembly is reflowed such that the surface tension of the contact pads causes the patterns of the optical component to align over the pattern on the interposer, thereby precisely positioning the optical component relative to the grooves of the interposer. Such a mechanism is well known and disclosed, for example, in U.S. Pat. No. 7,511,258, incorporated herein by reference.

In another embodiment, rather than or in addition to contact pads, other fiducials on the interposer are used to facilitate passive alignment. For example, the fiducials may be physical structures protruding from the planar surface that provide a register surface against which the edge of the optical component may contact to be positioned correctly on the interposer. Alternatively, the fiducials may be markings to enable visual alignment of the optical component on the interposer using a commercially-available, ultra-high precision die bonding machine, such as, for example, a Suss MicroTec machine (See, e.g., U.S. Pat. No. 7,511,258).

Figure 13:
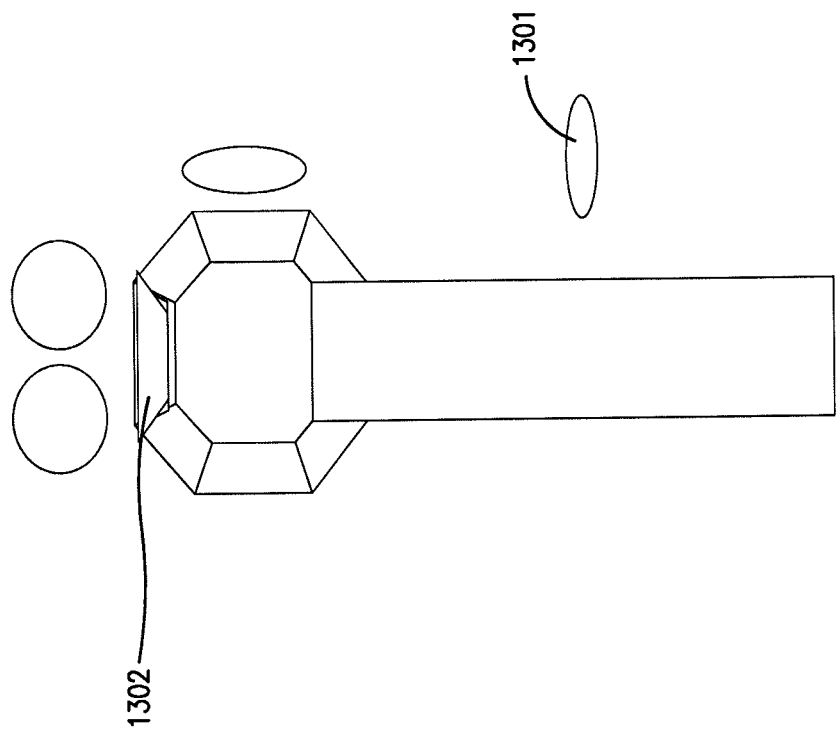
FIG. 13 shows a portion of the substrate of one embodiment of the interposer having a visual fiducial for disposing the optical conduit in the groove.

Referring to FIG. 13, yet another use of fiducials is shown. In this embodiment, a visual fiducial 1301 is applied during photolithography a precise distance from the first facet 1302. This way, if the first facet 1302 is obscured by the optical component or any other component, the pick and place assembly equipment can position the optical conduit in the groove based on the visual fiducial.

Additionally, a combination of fiducials and contact pads may be used. For example, the pads may be used to pull the optical component into contact with the raised fiducials of the interposer. Still other alignment techniques will be apparent to one of skill in the art in light of this disclosure.

Figure 3:
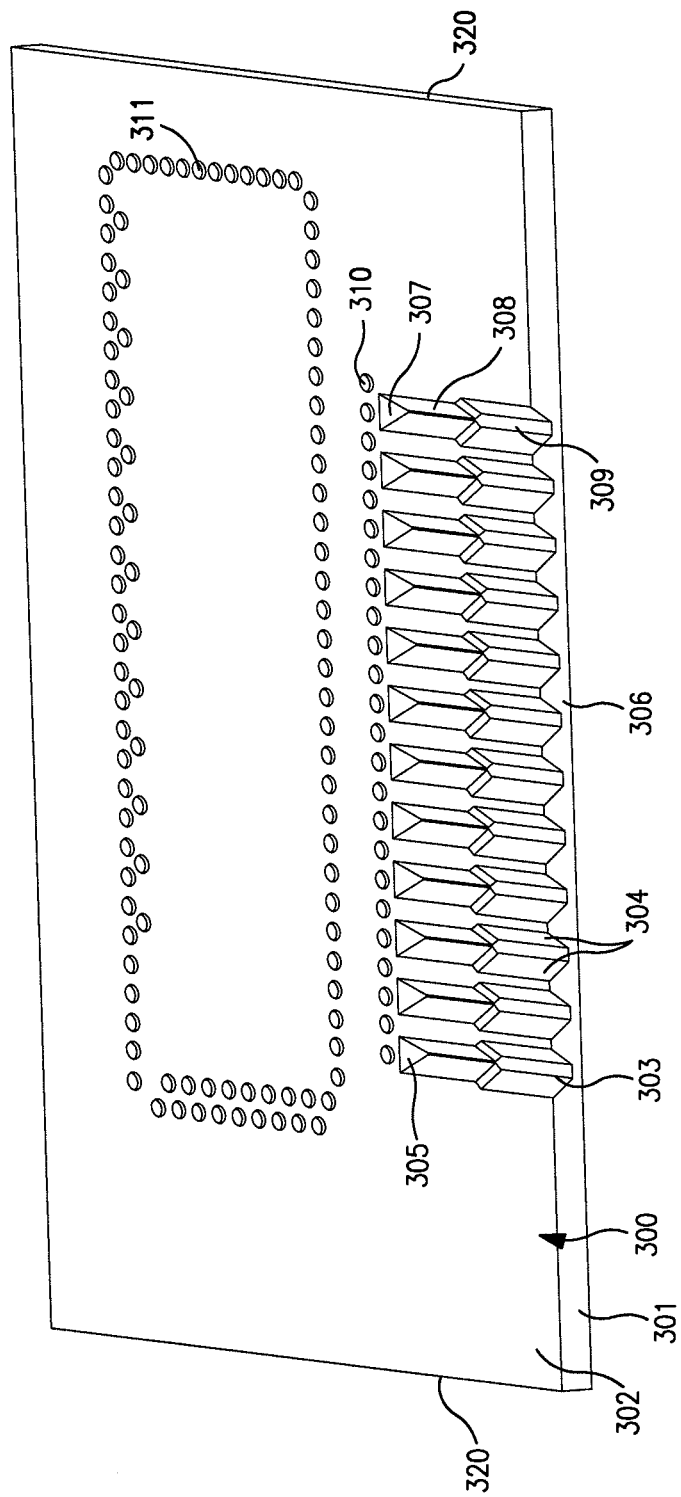
FIG. 3 shows one embodiment of the present invention showing multiple stepped V-grooves and contact pad patterns for receiving an opto-electrical device and related electrical circuitry.
Figure 7:
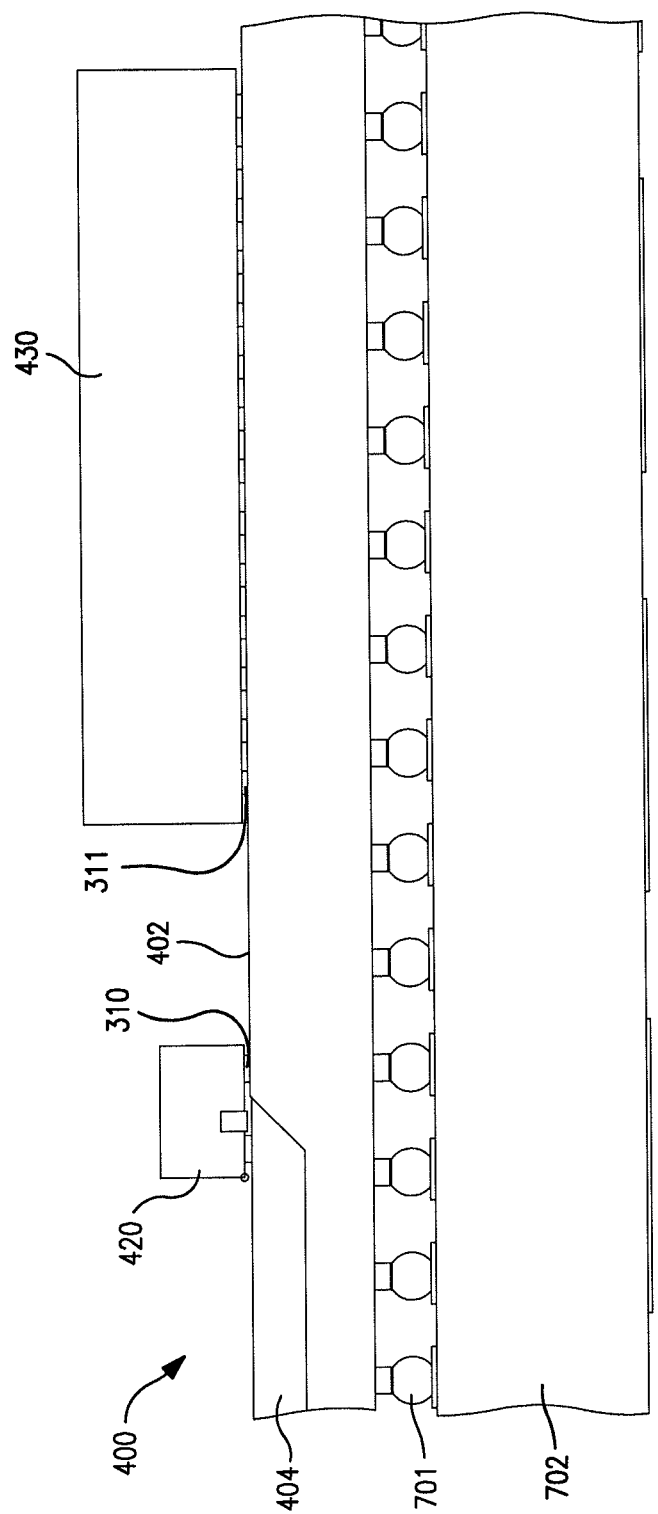
FIG. 7 shows a cross sectional view of the interposer shown in FIG. 4 with a planar waveguide disposed in the groove.

The interposer may also have circuitry (electrical/optical) for providing the necessary interconnections for supporting the optical component. For example, referring to FIGS. 4 and 7, an interposer 400 is shown comprising a substrate 401 having a top planar surface 402 and a series of grooves 403. The optical component 420, in this case, an array of VCSELs or PIN photodiodes, is disposed over the terminal ends of the grooves and aligned with pads 310 (as shown in FIG. 3) and optically coupled with the fibers 404. The required integrated circuit 430 for the optical component 420 is disposed proximate the optical component 420 and is also aligned with pads 311 (see FIG. 3). The pads 310 and 311 are interconnected with electrical traces (not shown for simplicity). Additionally, other traces (again, not shown for simplicity) electrically connect the integrated circuit 430 to through substrate 401 vias 440 along the perimeter of the interposer 400. The vias electrically interface the interposer with the higher level flex circuit or printed circuit board 702 through contact pads 701. This is a known technique.

Therefore, the interposer of the present invention may have one or more features for optically coupling an optical component to a fiber/planar waveguide, features for providing passive alignment of the fiber/planar waveguide and/or optical component, and electrical/optical interconnections for interconnecting the optical component with required circuitry and for interfacing the interposer with the higher level flex circuit or printed circuit board.

The interposer of the present invention also lends itself to economical and highly repeatable manufacturing. In particular, most if not all of the critical alignment relationships may be defined on the wafer scale, often in just a few, or even a single, photolithography step. Specifically, the location of the grooves for holding the fiber/planar waveguide and the contact pads for electrically connecting and providing passive alignment of the optical components may be defined in a single masking step. Additionally, in one embodiment, the optical/electrical interconnections among the various components may be defined in a single masking step. For example, the various traces interconnecting the pads for the optical component and the pads for the electrical driver circuitry, and the traces between the driver circuitry and the through substrate vias may be defined in a single masking step. In one embodiment, even the edges of the interposers are defined in the same masking step. In other words, each edge 320 of the interposer as shown in FIG. 3 is one half of a groove etched in the wafer. The wafer is simply parted at the bottom of each groove to form interposers with precisely controlled edges. This way, the distance from the edge 320 of the interposer to critical features such as the grooves 303 may be precisely controlled, often in a single step, thereby eliminating tolerance build up and simplifying assembly manufacturing with the interposer by use of these precisely controlled edges.

The etching may also be performed on wafer-scale. In one embodiment, the grooves, terminal end facets, and the edges of the interposer are all defined and etched at the wafer-scale. Further economies may be realized by etching these features in the same photolithographic procedure. Although a single etching procedure may be used, in certain circumstances, two or more etching procedures may be beneficial. That is, the facets of the interposer require dry etching to achieve the desired slope, however, the sidewalls of the interposer and the edges of the grooves may be etched using either wet or dry etching techniques. Therefore, if the dry etching is not as economical as wet etching (e.g., it takes longer and/or is more expensive), then it may be preferable to etch the terminal end facets using dry etching and the interposer and groove sidewalls/edges using wet etching.

Figure 17:
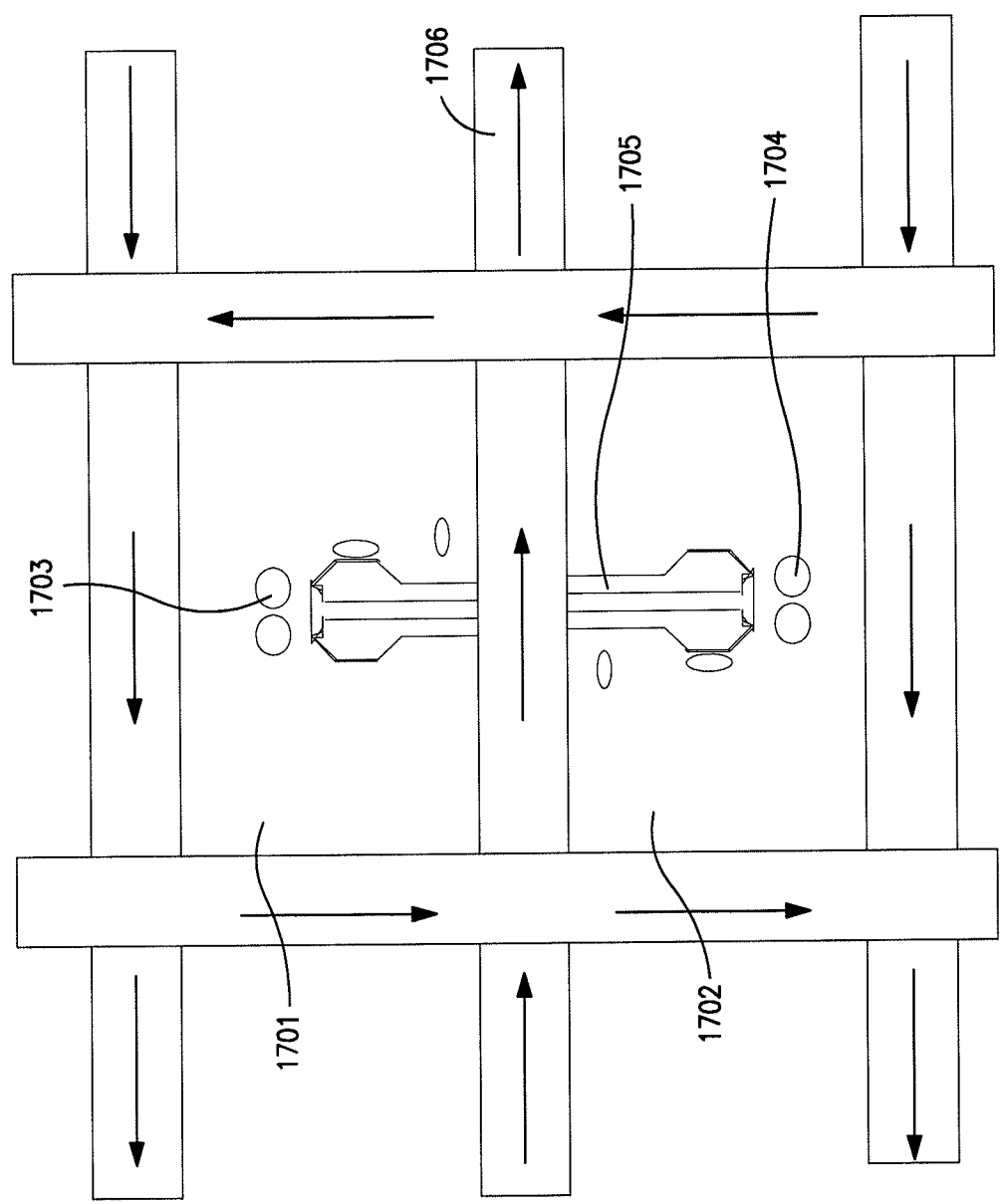
FIG. 17 shows a pair of transmitting/receiving interposers arranged on a wafer such that the optical conduit in the groove connections the optical components (not shown) of the interposer.

In one embodiment, the interposers are fabricated in pairs on a wafer. Specifically, referring to FIG. 17, a first interposer 1701 is a transmitting interposer, meaning it has a transmitting optical component (not shown) disposed on pads 1703, and a second interposer 1702 is a receiving interposer having a receiving optical component (not shown) on pads 1704. By preparing interposers in transmitting/receiving pairs, the pair may be tested before being integrated with a waveguide or other components of a subassembly. Specifically, before the individual interposers are diced along the indicated grooves 1706, they may be fitted with their optical components and related circuitry and energized. This way light would be generated at the first interposer 1701, transmitted down waveguide 1705 and into the second interposer 1702. Any defects in the circuitry and alignment of the components would be evident at this point, before incorporation of the interposer into the subassembly, thus saving time and material.

Figure 18:
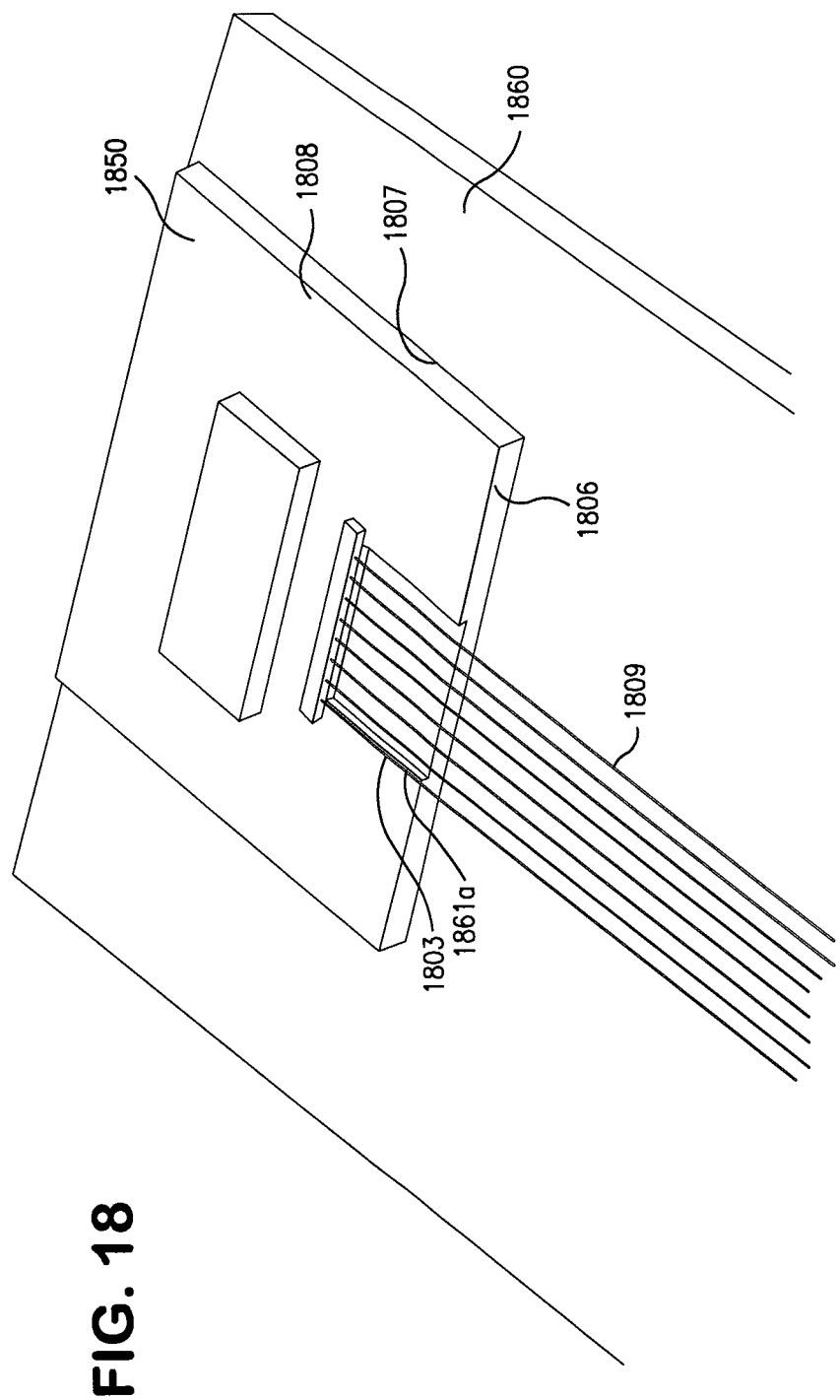
FIG. 18 shows the interposer incorporated into a planar waveguide.

The incorporation of the waveguide with the interposer may be performed in various ways. For example, as shown in FIG. 12, the interposer 1250 may be integrated with the waveguide 1260 via a common carrier 1270, such as a flex circuit. Alternatively, the interposer may be integrated directly into a ribbon waveguide. For example, referring to FIG. 18, a waveguide 1860 is shown with a notch 1808 cut out of one end of it. The notch has a notch edge 1807 which is U-shaped and configured to precisely receive the edge 1806 of the interposer 1850. (As described above, the edge of the interposer of the present invention can be controlled with a high degree of precision.) In this way, the waveguide 1860 receives the interposer 1850 and holds it precisely with respect to the waveguide cores 1809. In one embodiment, the optical conduits 1861 in the grooves 1803 are aligned with the cores 1809 in the ribbon waveguide 1860. In other embodiment, the individual waveguide are cut away from the surrounding material of the ribbon waveguide (see, e.g., FIG. 19), such that discrete waveguide fingers are inserted into the grooves 1803 as described with respect to FIG. 20.

It should be apparent from the above description that the interposer assembly of the present invention provides for significant advantages over conventional electro-optic module configurations such as lower cost and simplicity in manufacturing and enhanced versatility with respect to the type of mating components with which it can effect optically coupling. Still other advantages of the interposer assembly are anticipated.

What is claimed is:

1. An optical interposer comprising:
   a substrate having a top planar surface:
   at least one groove defined in said top planar surface and extending from an edge of said substrate to a terminal end, said groove having side walls and a first facet at said terminal end perpendicular to side walls, said facet having a first angle relative to said top planar surface, said first angle being about 45 degrees;
   a reflective coating on said first facet;
   polymeric optical conduit disposed in said groove and extending to said edge, said polymeric optical conduit having a core defining an optical axis, and an end face with at least a first mating facet having essentially said first angle relative to its optical axis such that said first mating facet and said first facet contact each other;
   a waveguide optically coupled to said polymeric optical conduit at said edge, wherein said polymeric optical conduit and said waveguide are integrally formed.

2. The optical interposer of claim 1, further comprising fiducials for passively aligning an optical component relative to said first facet.

3. The optical interposer of claim 1, further comprising at least one visual fiducial proximate said groove for disposing said optical conduit in said groove.

4. The interposer of claim 1, wherein said substrate is a portion of a wafer comprising additional interposers.

5. A subassembly comprising:
   an optical interposer comprising at least
      a substrate having a top planar surface:
      at least one groove defined in said top planar surface and extending from an edge of said substrate to a terminal end, said groove having side walls and a first facet at said terminal end perpendicular to said side walls, said first facet having a first angle relative to said planar surface;

a reflective coating on said first facet;

a polymeric optical conduit disposed in said groove and extending to said edge, said polymeric optical conduit having a core defining an optical axis, and an end face with at least a first mating facet having essentially said first angle relative to its optical axis such that said first mating facet and said first facet contact each other; and an optical component having an optical axis perpendicular to said top planar surface, said optic component being disposed on said top planar surface at said terminal end such that its optical axis is disposed over said first facet such that said optical component is optically coupled with said core of said polymeric optical conduit; and a waveguide optically coupled to said polymeric optical conduit at said edge, wherein said polymeric optical conduit and said waveguide are integrally formed.

6. The subassembly of claim 5, wherein said first angle is about 45 degrees.

7. The subassembly of claim 5, wherein said polymeric optical conduit is a polymer waveguide having said core defined in its interior.

8. The subassembly of claim 7, wherein said waveguide is a ribbon waveguide and wherein said polymeric optical conduit comprises a plurality of discrete waveguide fingers formed from said ribbon waveguide, each discrete waveguide finger being deposed in one of said grooves.

9. The subassembly of claim 8, wherein said ribbon waveguide is notched at one end, said notch corresponding to at least a portion of the perimeter of the interposer such that the interposer is held precisely in position relative to said discrete waveguide fingers of said ribbon waveguide.

10. The subassembly of claim 5, wherein said waveguide is notched at one end, said notch corresponding to at least a portion of the perimeter of the interposer such that the interposer is held precisely in position relative to said waveguide.

11. The optical subassembly of claim 5, wherein said polymeric optical conduit comprises a cladding.

12. The optical interposer of claim 1, wherein said polymeric optical conduit comprises a cladding.

13. The optical interposer of claim 1, wherein said waveguide is a ribbon waveguide and wherein said polymeric optical conduit comprises a plurality of discrete waveguide fingers formed from said ribbon waveguide, each discrete waveguide finger being deposed in one of said grooves.

14. The optical interposer of claim 13, wherein said ribbon waveguide is notched at one end, said notch corresponding to at least a portion of the perimeter of the interposer such that the interposer is held precisely in position relative to said discrete waveguide fingers of said ribbon waveguide.

15. The optical interposer of claim 1, wherein said waveguide is notched at one end, said notch corresponding to at least a portion of the perimeter of the interposer such that the interposer is held precisely in position relative to said waveguide.

16. The optical interposer of claim 1, wherein said polymeric optical conduit is a polymer waveguide having said core defined in its interior.

* * * * *